US012643530B1

(12) United States Patent
Ellenberger et al.

(10) Patent No.: US 12,643,530 B1
(45) Date of Patent: Jun. 2, 2026

(54) LOW EMISSION ENGINE BRAKING FOR VEHICLES

(71) Applicant: GM GLOBAL TECHNOLOGY OPERATIONS LLC, Detroit, MI (US)

(72) Inventors: John Michael Ellenberger, Huntington Woods, MI (US); Vijay A. Ramappan, Novi, MI (US); Michael J. Lucido, Milford, MI (US); Paul A. Battiston, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/267,804

(22) Filed: Jul. 14, 2025

(51) Int. Cl.
| | |
|---|---|
| *B60W 20/14* | (2016.01) |
| *B60W 10/02* | (2006.01) |
| *B60W 10/26* | (2006.01) |
| *F01N 3/20* | (2006.01) |

(52) U.S. Cl.
CPC ............ *B60W 20/14* (2016.01); *B60W 10/02* (2013.01); *B60W 10/26* (2013.01); *F01N 3/2013* (2013.01); *B60W 2510/068* (2013.01); *B60W 2510/244* (2013.01); *B60W 2540/10* (2013.01); *B60W 2556/50* (2020.02); *B60W 2710/021* (2013.01); *B60W 2710/244* (2013.01); *F01N 2900/10* (2013.01)

(58) Field of Classification Search
CPC ................ B60W 20/14; B60W 10/02; B60W 2510/068; B60W 2510/244; B60W 2540/10; B60W 2556/50; F01N 3/2013
See application file for complete search history.

(56) References Cited

U.S. PATENT DOCUMENTS

| | | | | |
|---|---|---|---|---|
| 6,554,088 | B2 * | 4/2003 | Severinsky | B60K 6/22 |
| | | | | 180/65.23 |
| 8,881,504 | B2 * | 11/2014 | Gonze | F01N 9/00 |
| | | | | 60/284 |
| 9,021,793 | B2 * | 5/2015 | Kim | F01N 3/0835 |
| | | | | 60/275 |
| 9,925,974 | B2 * | 3/2018 | Leone | F02D 41/0087 |
| 10,946,854 | B2 * | 3/2021 | Nawata | B60W 20/11 |
| 2003/0160455 | A1 | 8/2003 | Hu et al. | |
| 2019/0337504 | A1 | 11/2019 | Kelly et al. | |
| 2023/0193799 | A1 * | 6/2023 | Murakami | F01N 9/00 |
| | | | | 60/274 |
| 2024/0140259 | A1 | 5/2024 | Cox et al. | |

FOREIGN PATENT DOCUMENTS

DE  102012209202 A1 * 12/2012  ........... F02D 41/024

OTHER PUBLICATIONS

German Office Action for German Application No. 102025133382.3; dated Mar. 13, 2026; 3 pages.

* cited by examiner

*Primary Examiner* — Sherry L Estremsky

(74) *Attorney, Agent, or Firm* — CANTOR COLBURN LLP

(57) ABSTRACT

A method for utilizing engine braking to decelerate a vehicle including initiating a preheat in an electrically heated catalyst (EHC). Subsequent to initiating the preheat, the method allows an internal combustion engine (ICE) to spin by one of: engaging a clutch, converting rotation of the ICE to electrical energy, and storing the electrical energy in a rechargeable energy storage system (RESS), and spinning the ICE using electric energy from the RESS, generating regenerative braking energy, and storing the regenerative braking energy in the RESS.

20 Claims, 5 Drawing Sheets

LOW EMISSION ENGINE BRAKING FOR VEHICLES

INTRODUCTION

The subject disclosure relates to engine braking for vehicles, and in particular to a system and process to provide for clean engine braking.

As vehicles travel down long grades, an extended period of braking is required in order to prevent uncontrolled acceleration. Continued application of friction brakes during this braking process results in extensive wear on the friction brake and substantially decreases a life cycle of the brakes being utilized.

In vehicles including a rechargeable energy storage system (RESS), one method to reduce wear on the friction brakes is via the use of engine braking. In engine braking, a clutch is engaged from the internal combustion engine (ICE), but no combustible fuel is provided and consequently no driving power is provided to the wheels. When the wheels are driven in whole or in part via mechanical connections to the ICE, the ICE is allowed to spin and the spinning slows the vehicle.

In systems using a rechargeable battery (E.G. a plug in hybrid vehicle, PHEV) the rotation is passed to a generator, which provides additional braking and generates power to be stored in an RESS.

In the case of a certain type of hybrid where the engine is used to charge the RESS and has no mechanical connection between the engine and vehicle wheels, this solution provides braking until the RESS is at a maximum state of charge, after which the vehicle must rely on friction braking.

This type of hybrid is classified as a series-hybrid or extended range electric vehicle (EREV).

In addition to being limited by the state of charge of the RESS, spinning the engine in the engine braking mode as described previously can cause gaseous emissions from within the engine to be expelled through an exhaust system.

This can occur even though the engine is not being powered by a hydrocarbon fuel (e.g. diesel, gasoline) during engine braking.

Accordingly, it is desirable to provide a process that removes at least a portion of the gaseous emissions expelled from an engine during an engine braking operation.

SUMMARY

In one exemplary embodiment a method for utilizing engine braking to decelerate a vehicle including initiating a preheat in an electrically heated catalyst (EHC). Subsequent to initiating the preheat, the method allows an internal combustion engine (ICE) to spin by one of: engaging a clutch, converting rotation of the ICE to electrical energy, and storing the electrical energy in a rechargeable energy storage system (RESS), and spinning the ICE using electric energy from the RESS, generating regenerative braking energy, and storing the regenerative braking energy in the RESS.

In addition to one or more of the features described herein, the method further including initiating the EHC preheat in response to detecting the vehicle beginning an extended grade descent and determining that a deceleration assist is required for a duration of the descent.

In addition to one or more of the features described herein the method further includes determining that a deceleration assist is required comprises at least one of monitoring a pedal input, estimating a torque request, determining a deceleration rate of the vehicle, determining a time of the vehicle decelerating, determining a satellite positioning system of the vehicle, and an expected grade of a map location of the vehicle.

In addition to one or more of the features described herein, the method further includes monitoring a state of charge of the RESS, a grid temperature of the EHC, and a catalyst inlet temperature of a three-way catalyst and determining a first engine braking limit and a second engine braking limit based on the monitored state of charge of the RESS, the grid temperature of the EHC and the catalyst inlet temperature, wherein the first engine braking limit and the second engine braking limits are RESS state of charge values and wherein the second engine braking limit is higher than the first engine braking limit.

In addition to one or more of the features described herein the method further includes comparing the state of charge of the RESS to the first engine braking limit and the second engine braking limit and enabling an EHC system at the second engine braking limit and disabling EHC system at the first engine braking limit.

In addition to one or more of the features described herein the method further includes comparing the catalyst inlet temperature and activating the EHC responsive to the catalyst inlet temperature being below a threshold, the activating including providing power from the RESS to the EHC.

In addition to one or more of the features described herein The method further includes comparing the catalyst inlet temperature to being above a threshold, and enabling engine rotation and controlling engine actuators to maximize pumping losses of ICE rotation.

In addition to one or more of the features described herein, the method further includes maintaining a catalyst temperature above a threshold by using a closed loop control.

In addition to one or more of the features described herein, the method further includes enabling an evaporative canister purge during vehicle deceleration when the electrically heated catalyst is above a threshold temperature.

In another exemplary embodiment a vehicle includes an internal combustion engine (ICE) having an exhaust system having an electrically heated catalyst. At least one generator is configured to convert rotation of the ICE into electrical energy. At least one motor is configured to rotate or spin the ICE by consuming electrical energy. A rechargeable energy storage system electrically coupled to the at least one generator. A controller includes a memory and a processor. The memory stores instructions for causing the processor to perform operations including: initiating a preheat in an electrically heated catalyst (EHC), and subsequent to initiating the preheat, allowing an internal combustion engine (ICE) to spin by one of: engaging a clutch, converting rotation of the ICE to electrical energy, and storing the electrical energy in a rechargeable energy storage system (RESS), and spinning the ICE using electrical energy from the RESS, generating regenerative braking energy, and storing the regenerative braking energy in the RESS.

In addition to one or more of the features described herein the operations further comprise initiating the pre-heat in response to detecting the vehicle beginning an extended grade descent and determining that a deceleration assist is required for a duration of the descent.

In addition to one or more of the features described herein determining that a deceleration assist is required comprises at least one of monitoring a pedal input, estimating a torque request, determining a deceleration rate of the vehicle, determining a time of the vehicle decelerating, determining a satellite positioning system of the vehicle, and an expected grade of a map location of the vehicle.

In addition to one or more of the features described herein the operations further comprise monitoring a state of charge of the RESS, a grid temperature of the EHC, and a catalyst inlet temperature of a three-way catalyst and determining a first engine braking limit and a second engine braking limit based on the monitored state of charge of the RESS, the grid temperature of the EHC and the catalyst inlet temperature, wherein the first engine braking limit and the second engine braking limits are RESS state of charge values and wherein the second engine braking limit is higher than the first engine braking limit.

In addition to one or more of the features described herein the operations further comprise comparing the state of charge of the RESS to the first engine braking limit and the second engine braking limit and enabling an EHC system at the second engine braking limit and disabling the EHC system at the first engine braking limit.

In addition to one or more of the features described herein the operations further comprise comparing the catalyst inlet temperature and activating the EHC responsive to the catalyst inlet temperature being below a threshold, the activating including providing power from the RESS to the EHC.

In addition to one or more of the features described herein the operations further comprise comparing the catalyst inlet temperature to being above a threshold, and enabling engine rotation and controlling engine actuators to maximize pumping losses of ICE rotation.

In addition to one or more of the features described herein the operations further comprise maintaining a catalyst temperature above a catalyst threshold using a closed loop control.

In addition to one or more of the features described herein the operations further comprise enabling an evaporative canister purge during vehicle deceleration when the electrically heated catalyst is above a threshold temperature.

In yet another exemplary embodiment A vehicle includes an internal combustion engine (ICE) including an exhaust system having an electrically heated catalyst. At least one generator is configured to convert rotation of the ICE into electrical energy. At least one motor is configured to spin the ICE by consuming electrical energy. A rechargeable energy storage system (RESS) electrically coupled to the at least one generator. A controller includes a memory and a processor. The memory stores instructions for causing the processor to perform operations including initiating a preheat in an electrically heated catalyst (EHC). The preheat is initiated in response to detecting the vehicle beginning an extended grade descent. The operations further include determining that a deceleration assist is required for a duration of the descent by at least one of monitoring a pedal input, estimating a torque request, determining a deceleration rate of the vehicle, determining a time of the vehicle decelerating, determining a satellite positioning system of the vehicle, and an expected grade of a map location of the vehicle. The operations further include monitoring a state of charge of the RESS, a grid temperature of the EHC, and a catalyst inlet temperature of a three-way catalyst and determining a first engine braking limit and a second engine braking limit based on the monitored state of charge of the RESS and the grid temperature of the EHC and the catalyst inlet temperature. The first engine braking limit and the second engine braking limits are RESS state of charge values. The second engine braking limit is higher than the first engine braking limit. The operations further include comparing the state of charge of the RESS to the first engine braking limit and the second engine braking limit and enabling EHC preheat at the second limit and disabling EHC system at the first limit. The operations further include comparing the catalyst inlet temperature and activating the EHC responsive to the catalyst inlet temperature being below a threshold, the activating including providing power from the RESS to the EHC; and subsequent to initiating the preheat, allowing an internal combustion engine (ICE) to spin by one of: engaging a clutch, converting rotation of the ICE to electrical energy, and storing the electrical energy in a rechargeable energy storage system (RESS), and spinning the ICE using electrical energy from the RESS, generating regenerative braking energy, and storing the regenerative braking energy in the RESS.

In addition to one or more of the features described herein the operations further include enabling an evaporative canister purge during vehicle deceleration when the electrically heated catalyst is above a threshold temperature.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1A:
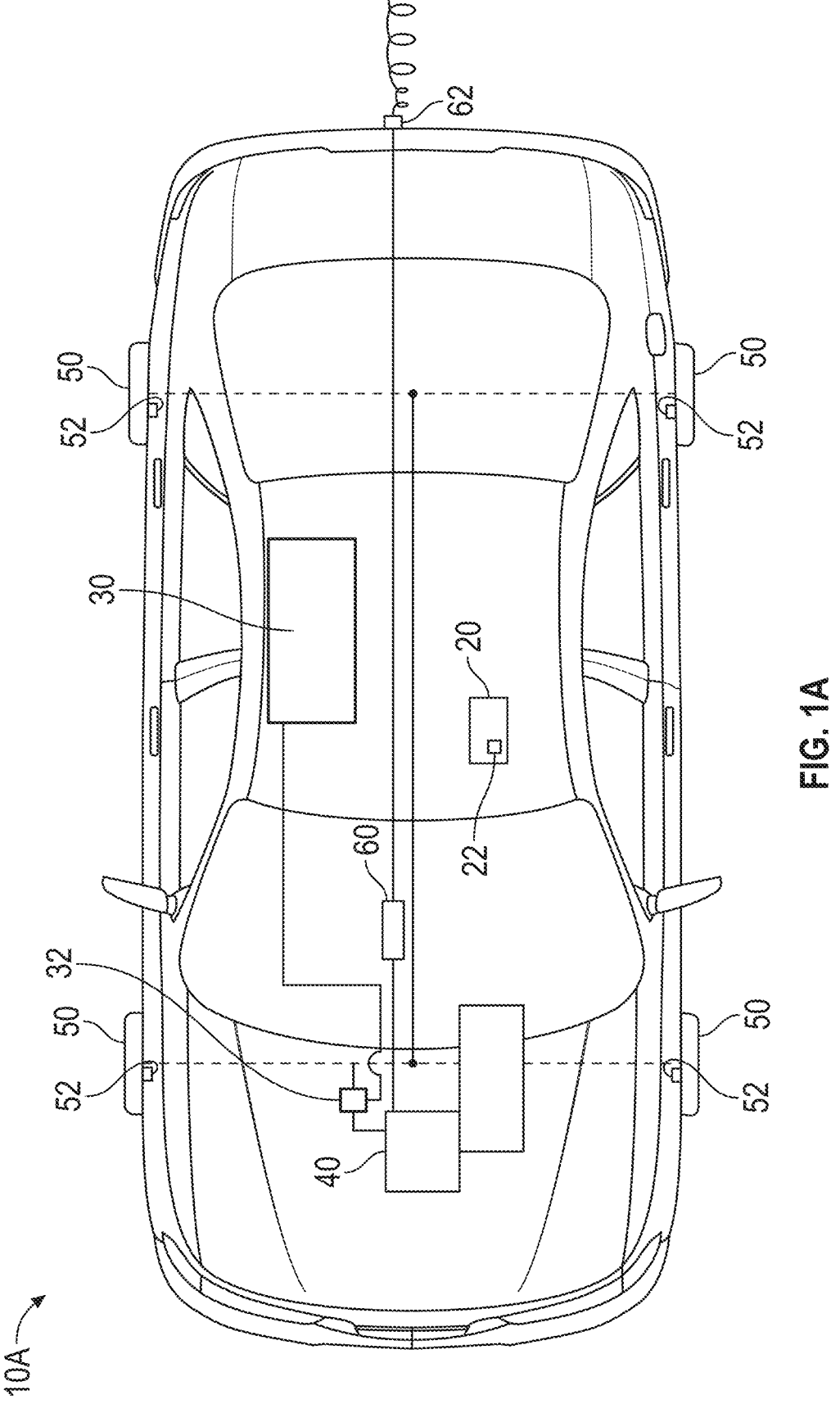
FIG. 1A is a plug in hybrid electric vehicle including a clean engine braking system.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As used herein, the term controller refers to a system including at least a processor and a memory, with the system being configured to perform or cause to be performed at least one operation. The system can be a dedicated controller including a single purpose processor and memory, a general control including one or more modules for performing the operation, a distributed system including multiple controllers in communication with each other and configured to control the operation, or any similar system.

In a general example of the systems and processes described herein, a vehicle begins a long graded descent and engages a clean engine braking operational mode. For a plug in hybrid vehicle (PHEV), the clean engine braking operations include initiating a pre-heat in an electrically heated catalyst (EHC) and allowing the engine to spin via the mechanical connections with the wheels and electric motor while converting the rotation of the electric motor into electrical energy. In the case of the extended range electric vehicle (EREV), the electric motor spins the engine to consume the electric energy stored in the RESS. This creates capacity in the RESS to absorb the energy produced by another electric motor, or set of electric motors, connected to the vehicle driveline. The motor, or set of motors, generates energy as the motor, or set of motors, provides resistance to driveline rotation to absorb energy to decelerate the vehicle.

The operation of the electrically heated catalyst (EHC) during the engine braking operation allows for removal of gaseous emissions that would be expelled through an exhaust system, thereby ensuring clean operation during the engine braking process.

Figure 1B:
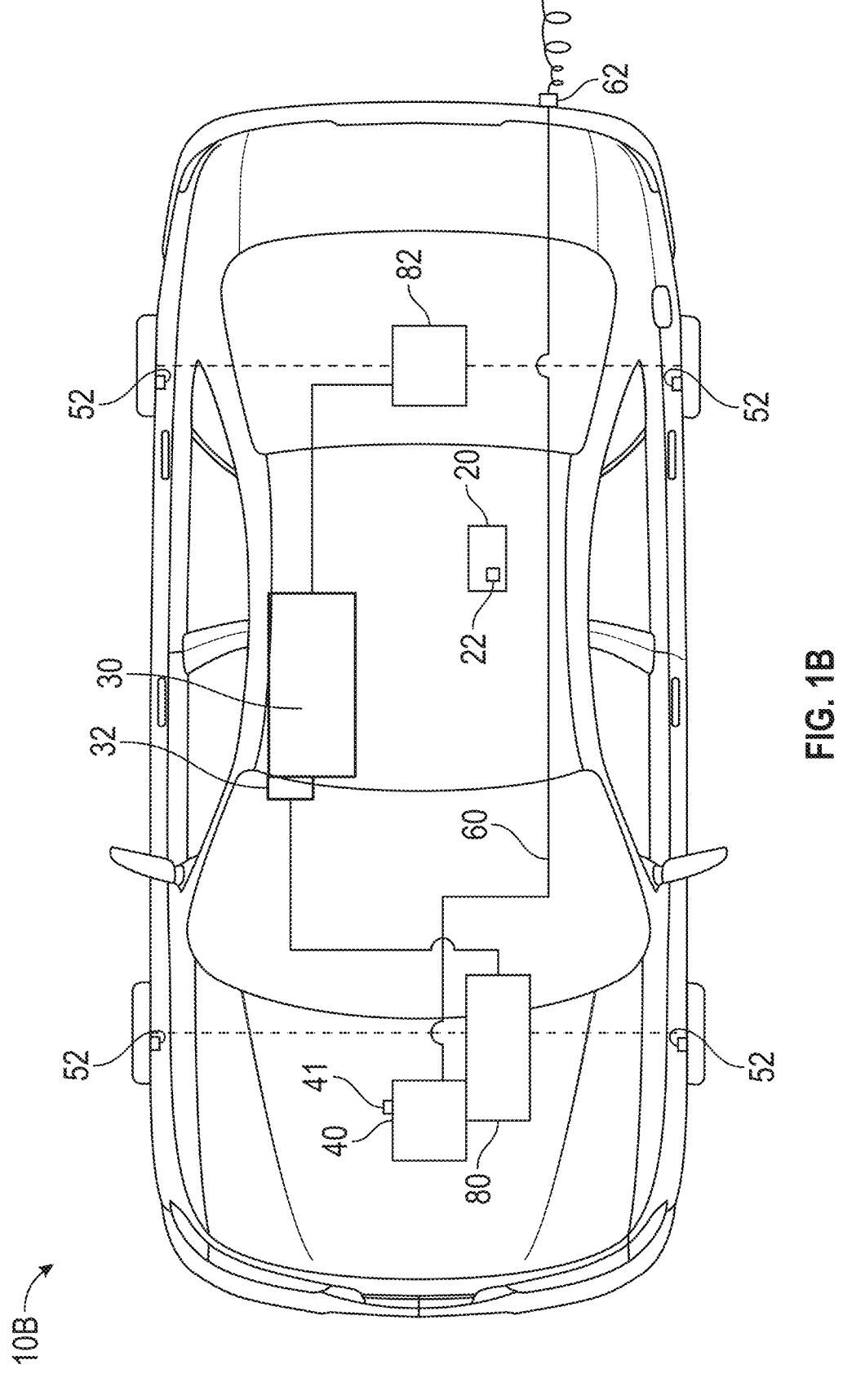
FIG. 1B is an extended range electric vehicle including a clean engine braking system.

In accordance with an exemplary embodiment, FIGS. 1A and 1B illustrates vehicles 10A and 10B (referred to generically as vehicle 10) with FIG. 1A illustrating a PHEV 10A and FIG. 1B illustrating an EREV 10B. Common structure between vehicles 10A and 10B are provided identical numbering. A general vehicle controller 20 is in communication with multiple vehicle systems and structures via any conventional communication configuration, including wireless, wired, direct communication, indirect communication, or any similar communication configuration.

The vehicle 10 includes a rechargeable energy storage system (RESS 30), such as a battery or a set of batteries. A generator/motor or set of generator/motors is configured to receive rotational motion and convert the rotational motion into electrical energy for storage within the RESS 30. Energy from the RESS 30 may be provided to any number of systems onboard the vehicle 10 providing operational power to the connected systems.

In a PHEV 10A, an internal combustion engine (ICE 40) generates torque and is linked to one or more wheels 50 through an electric motor/generator 32 to propel the vehicle 10. Combustion byproducts are expelled from the ICE 40 into an exhaust system 60 and expelled from the vehicle 10 through one or more tail pipes 62.

In an EREV 10B, an internal combustion engine (ICE 40) is connected to an electric motor 80 which converts the rotational kinetic energy from the engine to electrical energy to be stored in the RESS 30. A second electric motor 82, or set of motors, are connected to the drive wheels and can arbitrate energy into and from the RESS. Combustion byproducts are expelled from the ICE 40 into an exhaust system 60 and expelled from the vehicle 10 through one or more tail pipes 62.

The wheels 50 are equipped with friction brakes 52. The friction brakes 52 can be engaged to slow or stop rotation of the wheels 52, and thus slow or stop movement of the vehicle 10. During long grade descents, slowing the vehicle 10 using only the friction brakes results in elevated levels of wear on the friction brakes 52, and can substantially shorten the lifespan of the friction brakes 2. In order to reduce the wear on the friction brakes 52, the controller 20 includes a module 22 configured to engage an engine braking operation during the long grade descents.

In the case of a PHEV 10A (vehicle 10A of FIG. 1A), during engine braking, the ICE 40 is engaged to the wheels 50. The ICE 40 regenerative engine braking, where the rotation of the wheels is translated to the electrical motor/generator 32, which converts the rotation into energy that is then stored in the RESS 30.

In the case of an EREV (vehicle 10B of FIG. 1B), the energy from the RESS 30 is used to spin the ICE 40 using electric motor/generator 32 and a clutch 41. The spinning of the ICE 40 frees up charge capacity in the RESS to absorb regenerative braking energy from the wheels as described previously. In order to ensure clean operation of the vehicle 10 during the engine braking process, an electrically heated catalyst within the exhaust system 60 is engaged to remove gaseous emissions that are expelled from the ICE 40.

Figure 2:
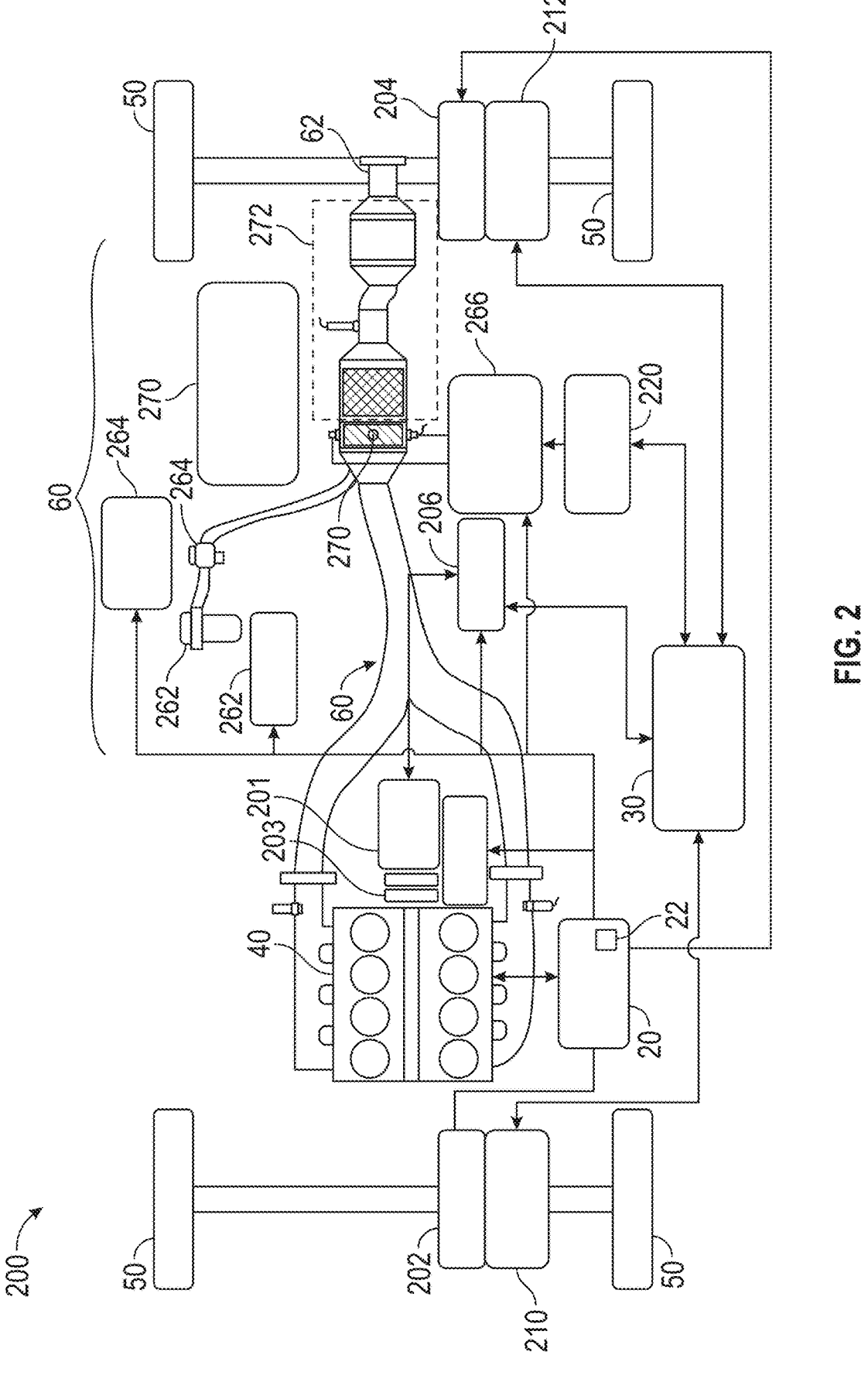
FIG. 2 is a schematic representation of the clean engine braking systems vehicle of FIG. 1B.

With continued reference to the general vehicle 10 of FIGS. 1A and 1B, FIG. 2 provides a schematic representation 200 of particular vehicle systems for operating the general clean engine braking process according to an EREV 10B example. The controller 20 is controllably coupled to multiple implementation modules 202, 204, 206 (referred to generally as modules 202, 204, 206). The modules 202, 204, 206 receive control instructions from the controller 20 and generate corresponding implementation signals for local systems. The implementation signals provide direct controls to the connected systems. By way of example, the first module 202 is proximate a first electric motor 210 and provides control signals for operating the first electric motor 210. The second module 204 is proximate a second electric motor 212 and provides control signals for operating and regulating the second electric motor 212.

In the particular example of FIG. 2, an air pump 262, an air shut of valve 264 and a power module control unit 266 are in communication with the controller 20 and the controller 20 provides direct controls to to the air pump 262, the air shut off valve 264, and the power module control unit 266.

The exhaust system includes an electrically heated catalyst (EHC 270) and at least one three way catalyst 272. During normal vehicle 10 operations, the catalysts 270, 272 operate to remove gaseous emissions according to any catalyst operation.

The RESS 30 is connected to the first motor 210 and the second motor 212 and provides driving electric power to the motors, as well as receiving electric power from the motors 210, 212 when the motors 210, 212 are operating in a generator mode (e.g., during regenerative engine braking operation). A Direct Current (DC)/DC converter 220 receives power from the RESS 30 and is controlled by the controller 20. The DC/DC converter provides DC power to the power converter control unit 266, which controls the operation of the EHC 270. RESS 30 is also connected to a power module control unit 206 which is connected to a second motor/generator 201 integrated into the engine 40 via a clutch 203.

While particular electrical and mechanical connections are discussed and illustrated herein, it is appreciated that practical implementations may include additional connections and/or components of the engine braking systems and may be utilized with other vehicle systems unrelated to the engine braking operations alongside and in addition to the engine braking systems. Such systems are omitted here for clarity.

Figure 3:
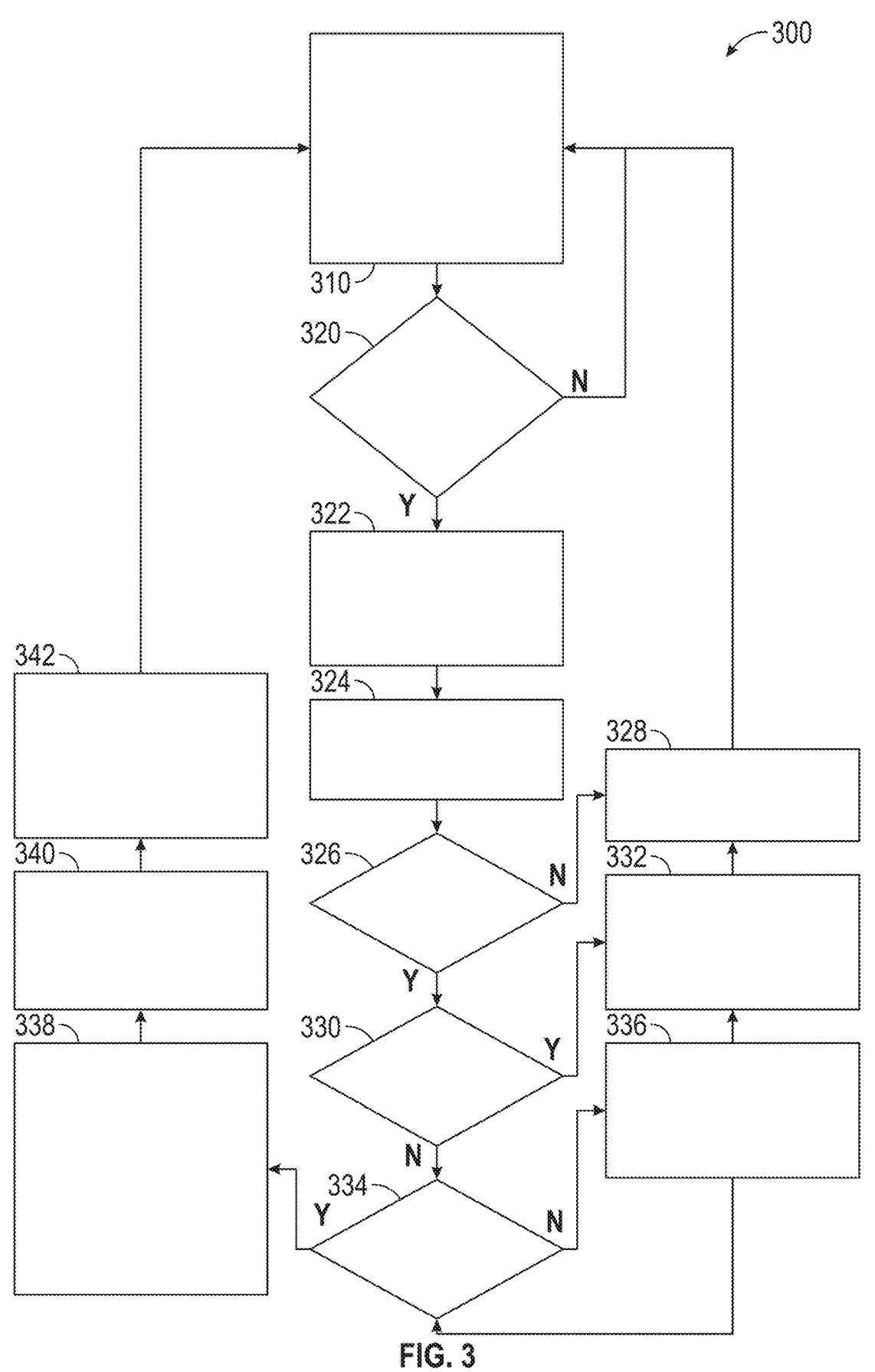
FIG. 3 is a process flow for operating the clean engine braking systems of FIG. 2.

With continued reference to the schematic 200 of FIG. 2, FIG. 3 illustrates a process 300 for operating a clean engine braking operation according to an implementation. Initially the controller 20 monitors the vehicle for indicators that an engine braking operation is needed in a monitoring step 310. The monitoring can include, but is not limited to, monitoring a pedal input, estimating a torque request, determining a deceleration rate of the vehicle 10, determining a time of the vehicle decelerating, a satellite positioning system of the vehicle, and/or an expected grade of a map location of the vehicle.

When the monitoring step 310 determines that the vehicle is entering a downward grade, the process 300 checks to determine if a deceleration assist is required at an "is deceleration assist required" check 320. When no deceleration assist is required, the process 300 returns to the monitoring step 310 and continues monitoring.

When the check 320 determines that a deceleration assist is required, the process 300 proceeds to monitor a state of charge (SOC) of the RESS 30, a grid temperature of the EHC 270, and a catalyst inlet temperature of the three way catalyst 272 in a "monitor catalyst" step 322. Based on the determined temperatures and state of charge as well as an absolute state of charge limit for the RESS 30, a first engine braking limit (EB1) and a second engine braking limit (EB2) are calculated in a "calculate engine braking limits" step 324.

The engine braking limits EB1 and EB2 represent SOC thresholds in the clean braking operation where actions are taken to enable and disable EHC heating.

After establishing EB1, and EB2, the process 300 checks to determine if the current battery below the first established engine braking limit EB1 in a "compare SOC" check 326. When the SOC is below the first established engine braking limit EB1, the process 300 enables a regenerative braking operation using attached electric motors 210, 212 in a "regenerative braking" step 328. The process 300 then proceeds back to the initial monitoring step 310 and reiterates.

When the SOC is above EB1, the process 300 proceeds to check the temperature of the catalyst in a "catalyst temperature check" 330. If the catalyst temperature is below a minimum catalyst temperature, the process 300 enables the EHC 270 by providing power to an EHC 270 grid and supplementing airflow to the EHC 270 using the air pump 272 in an "enable EHC" step 332. Once the EHC 270 is operating, the process 300 then proceeds to the regenerative braking step 328, and proceeds as described previously.

When the catalyst temperature check 330 determines that the catalyst temperature is above the minimum temperature threshold, the process 300 proceeds to compare a state of charge of the RESS 30 to the EB1 limit in a "state of charge" comparison 334.

When the state of charge is below the EB1 limit, the process 300 proceeds to enable regenerative braking in an "enable regenerative braking" step 336.

When the state of charge is at or above the EB1 limit at check 334, the process 300 proceeds to utilize the electric motors to spin the ICE via step 338 in the case of an EREV. In the case of a PHEV, a mechanical connection to the engine and wheels is made by a clutch to spin the ICE. During the engine spinning process, the engine actuators are controlled by controller 20 to maximize pumping losses by cam timing and state control. For a PHEV, the ICE pumping losses are used to slow down the vehicle. For an EREV, spinning the engine with high pumping losses using an electric motor increases the consumption of electric energy from the RESS and frees up space for regenerative braking energy.

As the ICE is spun, closed loop control of the EHC 270 power and airflow is employed in a "control" step 340. The closed loop control of the EHC 270 power and airflow maintains the temperature in catalyst 272 above a minimum temperature, thereby ensuring that harmful gaseous emissions expelled through the exhaust system 60 due to the spinning ICE are removed prior to exiting the vehicle tail pipe 62.

In cases where the engine braking process 300 extends for a sufficiently long period, a canister of the EHC 270 may become saturated, or otherwise absorb enough hydrocarbons that efficiency of the EHC 270 is reduced. When this occurs, the process 300 enables an evaporative canister purge in a "purge" step 342. The hydrocarbons in the evaporative canister purge are oxidized via the catalyst 272 while the EHC 270 is powered to maintain a minimum temperature to promote oxidation reactions in catalyst 272.

The process 300 then returns to the initial monitoring step 310 and continues monitoring vehicle 10 operations.

Figure 4:
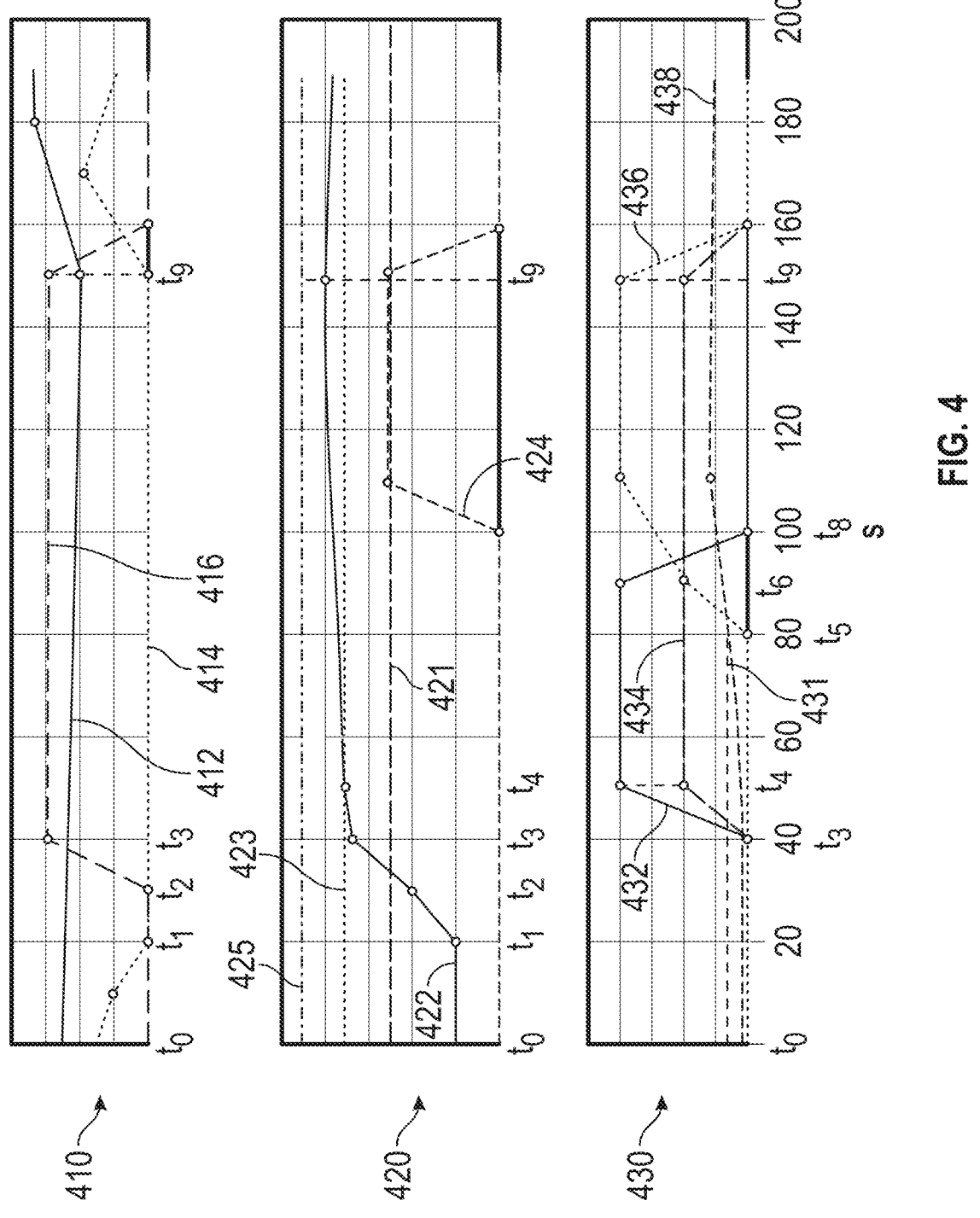
FIG. 4 is an example clean engine braking operation ending via a manual stop.

With continued reference to the process 300, FIG. 4 provides charts 410, 420, 430 illustrating operations of the process 300 with respect to time. The charts 410, 420, 430 utilize a normalized vertical axis, with no units for comparison purposes and a horizontal time (in seconds) axis.

The first SOC limit 421 (EB2) SOC limit provides a threshold for disabling engine spinning to consume energy in the RESS when engine spinning is already enabled in the case of the EREV and provides a threshold for disabling engine braking when engine braking is in the enabled state in the case of a PHEV.

The top chart 410 illustrates a vehicle speed 412, a position of an acceleration pedal 414, and a deceleration torque 416 provided by engine braking.

The middle chart 420 illustrates a state of charge (SOC 422) of the RESS 30, and cam timing control strategy 424. The cam timing control strategy is an operations profile for operating the cam timing to achieve specific engine characteristics. Also illustrated on the chart are the first SOC limit 421 (EB2) the second SOC limit 423 (EB1) and the maximum SOC 425.

The bottom chart 430 illustrates an engine airflow control 432, a state 434 of the EHC 270, a speed at which the engine is spinning (engine speed 436) and a catalyst temperature 438 of the EHC 270. Also illustrated in the bottom chart 430 is a minimum operational catalyst temperature 431 of the EHC 270. The minimum operational catalyst temperature is the temperature 431 at which the catalyst is chemically activated to remove harmful gaseous emissions such as hydrocarbons, Carbon Monoxide and Oxides of Nitrogen.

At t0, the vehicle 10 detects that engine braking is required via acceleration pedal (curve 414) approaching 0 (e.g., a closed or not depressed pedal) and is at 0 at 11. At t1, regenerative braking is engaged and the SOC 422 begins increasing. When the SOC 422 approaches the upper SOC limit 423 at 13, the EHC 270 is activated and the airflow controls 432, EHC 270 state 434 and catalyst temperature 438 begins increasing. The regenerative braking begins applying a deceleration torque 416, and the deceleration torque 416 ramps up to a maximum possible deceleration torque 416 at 13.

At t5, the catalyst temperature 438 meets the minimum operational temperature 431 and the controller 20 begins spinning the ICE 40 consuming the energy from the RESS.

At t6 the airflow controls 432 begin decreasing in coordination with engine exhaust flow provided by engine speed 436. As an example, the airflow controls 432 are fully ramped down at t8 and engine braking cam strategies 424 are engaged to provide further optimized braking for a PHEV or an increased energy consumption for an EREV. The airflow controls can be ramped down or fully disables as the spinning engine provides airflow, eliminating the need for supplemental airflow controls, such as those provided by an electric air pump. At t9, the pedal inputs 414 are changed due to the vehicle 10 reaching the end of the grade, or some other variation in the traffic conditions, and the clean engine braking process is disengaged.

In some alternate examples, when the SOC 422 drops to the first SOC limit 421 due to energy consumption from spinning the engine, the engine braking process can be disengaged and only regenerative braking is applied.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for utilizing engine braking to decelerate a vehicle comprising:
    initiating a preheat in an electrically heated catalyst (EHC); and
    subsequent to initiating the preheat, allowing an internal combustion engine (ICE) to spin by one of:
        engaging a clutch, converting rotation of the ICE to electrical energy, and storing the electrical energy in a rechargeable energy storage system (RESS), and
        spinning the ICE using electric energy from the RESS, generating regenerative braking energy, and storing the regenerative braking energy in the RESS.

2. The method of claim 1, further comprising initiating the EHC preheat in response to detecting the vehicle beginning an extended grade descent and determining that a deceleration assist is required for a duration of the descent.

3. The method of claim 2, wherein determining that a deceleration assist is required comprises at least one of monitoring a pedal input, estimating a torque request, determining a deceleration rate of the vehicle, determining a time of the vehicle decelerating, determining a satellite positioning system of the vehicle, and an expected grade of a map location of the vehicle.

4. The method of claim 1, further comprising monitoring a state of charge of the RESS, a grid temperature of the EHC, and a catalyst inlet temperature of a three-way catalyst and determining a first engine braking limit and a second engine braking limit based on the monitored state of charge of the RESS, the grid temperature of the EHC and the catalyst inlet temperature, wherein the first engine braking limit and the second engine braking limits are RESS state of charge values and wherein the second engine braking limit is higher than the first engine braking limit.

5. The method of claim 4, further comprising comparing the state of charge of the RESS to the first engine braking limit and the second engine braking limit and enabling an EHC system at the second engine braking limit and disabling EHC system at the first engine braking limit.

6. The method of claim 4, further comprising comparing the catalyst inlet temperature and activating the EHC responsive to the catalyst inlet temperature being below a threshold, the activating including providing power from the RESS to the EHC.

7. The method of claim 4, further comprising comparing the catalyst inlet temperature to being above a threshold, and enabling engine rotation and controlling engine actuators to maximize pumping losses of ICE rotation.

8. The method of claim 4, further comprising maintaining a catalyst temperature above a threshold by using a closed loop control.

9. The method of claim 1, further comprising enabling an evaporative canister purge during vehicle deceleration when the electric heated catalyst is above a threshold temperature.

10. A vehicle comprising:
    an internal combustion engine (ICE) including an exhaust system having an electrically heated catalyst;
    at least one generator configured to convert rotation of the ICE into electrical energy;
    at least one motor configured to rotate or spin the ICE by consuming electrical energy;
    a rechargeable energy storage system electrically coupled to the at least one generator; and
    a controller including a memory and a processor, wherein the memory stores instructions for causing the processor to perform operations including:
        initiating a preheat in the electrically heated catalyst (EHC); and
        subsequent to initiating the preheat, allowing the internal combustion engine (ICE) to spin by one of:
            engaging the clutch, converting rotation of the ICE to electrical energy, and storing the electrical energy in a rechargeable energy storage system (RESS), and
            spinning the ICE using electrical energy from the RESS, generating regenerative braking energy, and storing the regenerative braking energy in the RESS.

11. The vehicle of claim 10, wherein the operations further comprise initiating the pre-heat in response to detecting the vehicle beginning an extended grade descent and determining that a deceleration assist is required for a duration of the descent.

12. The vehicle of claim 11, wherein determining that a deceleration assist is required comprises at least one of monitoring a pedal input, estimating a torque request, determining a deceleration rate of the vehicle, determining a time of the vehicle decelerating, determining a satellite positioning system of the vehicle, and an expected grade of a map location of the vehicle.

13. The vehicle of claim 10, wherein the operations further comprise monitoring a state of charge of the RESS, a grid temperature of the EHC, and a catalyst inlet temperature of a three-way catalyst and determining a first engine braking limit and a second engine braking limit based on the monitored state of charge of the RESS, the grid temperature of the EHC and the catalyst inlet temperature, wherein the first engine braking limit and the second engine braking limits are RESS state of charge values and wherein the second engine braking limit is higher than the first engine braking limit.

14. The vehicle of claim 13, wherein the operations further comprise comparing the state of charge of the RESS to the first engine braking limit and the second engine braking limit and enabling an EHC system at the second engine braking limit and disabling the EHC system at the first engine braking limit.

15. The vehicle of claim 13, wherein the operations further comprise comparing the catalyst inlet temperature and activating the EHC responsive to the catalyst inlet temperature being below a threshold, the activating including providing power from the RESS to the EHC.

16. The vehicle of claim 13, wherein the operations further comprise comparing the catalyst inlet temperature to being above a threshold, and enabling engine rotation and controlling engine actuators to maximize pumping losses of ICE rotation.

17. The vehicle of claim 13, wherein the operations further comprise maintaining a catalyst temperature above a catalyst threshold using a closed loop control.

18. The vehicle of claim 10, wherein the operations further comprise enabling an evaporative canister purge during vehicle deceleration when the electrically heated catalyst is above a threshold temperature.

19. A vehicle comprising:

an internal combustion engine (ICE) including an exhaust system having an electrically heated catalyst;

at least one generator configured to convert rotation of the ICE into electrical energy;

at least one motor configured to spin the ICE by consuming electrical energy;

a rechargeable energy storage system (RESS) electrically coupled to the at least one generator; and a controller including a memory and a processor, wherein the memory stores instructions for causing the processor to perform operations including:

initiating a preheat in the electrically heated catalyst (EHC), wherein the pre-heat is initiated in response to detecting the vehicle beginning an extended grade descent and determining that a deceleration assist is required for a duration of the descent, and wherein determining that a deceleration assist is required comprises at least one of monitoring a pedal input, estimating a torque request, determining a deceleration rate of the vehicle, determining a time of the vehicle decelerating, determining a satellite positioning system of the vehicle, and an expected grade of a map location of the vehicle;

monitoring a state of charge of the RESS, a grid temperature of the EHC, and a catalyst inlet temperature of a three-way catalyst and determining a first engine braking limit and a second engine braking limit based on the monitored state of charge of the RESS, the grid temperature of the EHC and the catalyst inlet temperature, wherein the first engine braking limit and the second engine braking limits are RESS state of charge values and wherein the second engine braking limit is higher than the first engine braking limit;

comparing the state of charge of the RESS to the first engine braking limit and the second engine braking limit and enabling EHC preheat at the second engine braking limit and disabling EHC system at the first engine braking limit;

comparing the catalyst inlet temperature and activating the EHC responsive to the catalyst inlet temperature being below a threshold, the activating including providing power from the RESS to the EHC; and subsequent to initiating the preheat, allowing the internal combustion engine (ICE) to spin by one of:

engaging the clutch, converting rotation of the ICE to electrical energy, and storing the electrical energy in a rechargeable energy storage system (RESS), and spinning the ICE using electrical energy from the RESS, generating regenerative braking energy, and storing the regenerative braking energy in the RESS.

20. The vehicle of claim 19, wherein the operations further include enabling an evaporative canister purge during vehicle deceleration when the electrically heated catalyst is above a threshold temperature.

* * * * *